S. D. TUTTLE.
Weather-Strips.

No. 148,583.  Patented March 17, 1874.

Witnesses.
Edw. W. Donn
M. Gardner

Inventor.
Sterling D. Tuttle.
By J. B. Hunt & Co. Attys.

UNITED STATES PATENT OFFICE.

STERLING D. TUTTLE, OF EATON, OHIO.

IMPROVEMENT IN WEATHER-STRIPS.

Specification forming part of Letters Patent No. 148,583, dated March 17, 1874; application filed July 29, 1873.

*To all whom it may concern:*

Be it known that I, STERLING D. TUTTLE, of Eaton, Preble county and State of Ohio, have invented certain Improvements in Weather-Strips for Doors, of which the following is a specification:

My invention relates to an improvement in weather-strips for doors in such a manner as to prevent the rubber from being drawn out of place by being frozen to the door-sill, the rubber strips being attached firmly to the bar to which the springs are attached, and having guards through which the rubber-strips pass, which guards fit snugly against the rubber, thus preventing it from being torn off, and also forming an air-tight joint.

Figure 1:
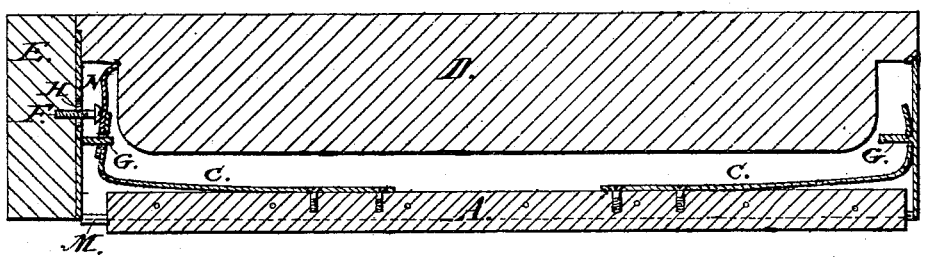
Figure 2:
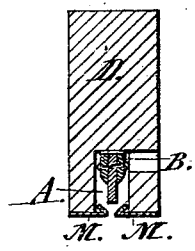
Figure 3:
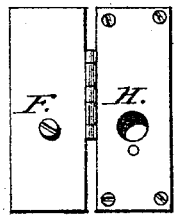

Figure 1 is a longitudinal section, showing the springs C attached to the bar B, which carries the rubber A. Fig. 2 is a cross-section, showing the bar B with the rubber A attached, and the guard M. Fig. 3 is an end view, showing the manner of attaching the strip to the door.

A is the rubber; B, the bar, to which it is attached, by being placed in a groove or slot in the same, and the whole bolted or secured firmly together. C C are springs attached to the bar B, the ends of the springs curving upward, and having holes through which the bolts or pins G G pass. F is a pin attached to the casing E of the door. This pin passes through the holes H, and presses against the spring C, compressing the spring, and consequently pushing the bar B and rubber strip A downward against the door-sill. The guards M M, fitting the rubber snugly, form an air-tight joint, the upper edge of the rubber being held firmly in the bar B, the lower edge being left free to suit itself to any inequality of the door-sill, the guards preventing the rubber from being torn off by being frozen to the sill of the door.

The supplemental spring N is for the purpose of assisting the springs C in regaining their place. These supplemental springs may be placed at one or both sides of the door, and may be made either flat, as shown, or may be a coiled-wire spring. The pin E, being placed in the casing of the door, is out of the way, and is less liable to be broken off or get out of order.

Having thus fully described my invention, what I claim, and desire to secure by Letters Patent, is—

The combination of the rubber A, bar B, and guards M M with the springs C C, supplemental spring N, and pin F, arranged substantially as and for the purpose specified.

STERLING D. TUTTLE.

Witnesses:
  NELSON A. HUNT,
  CALEB ELLIOTT.